Figure 5:
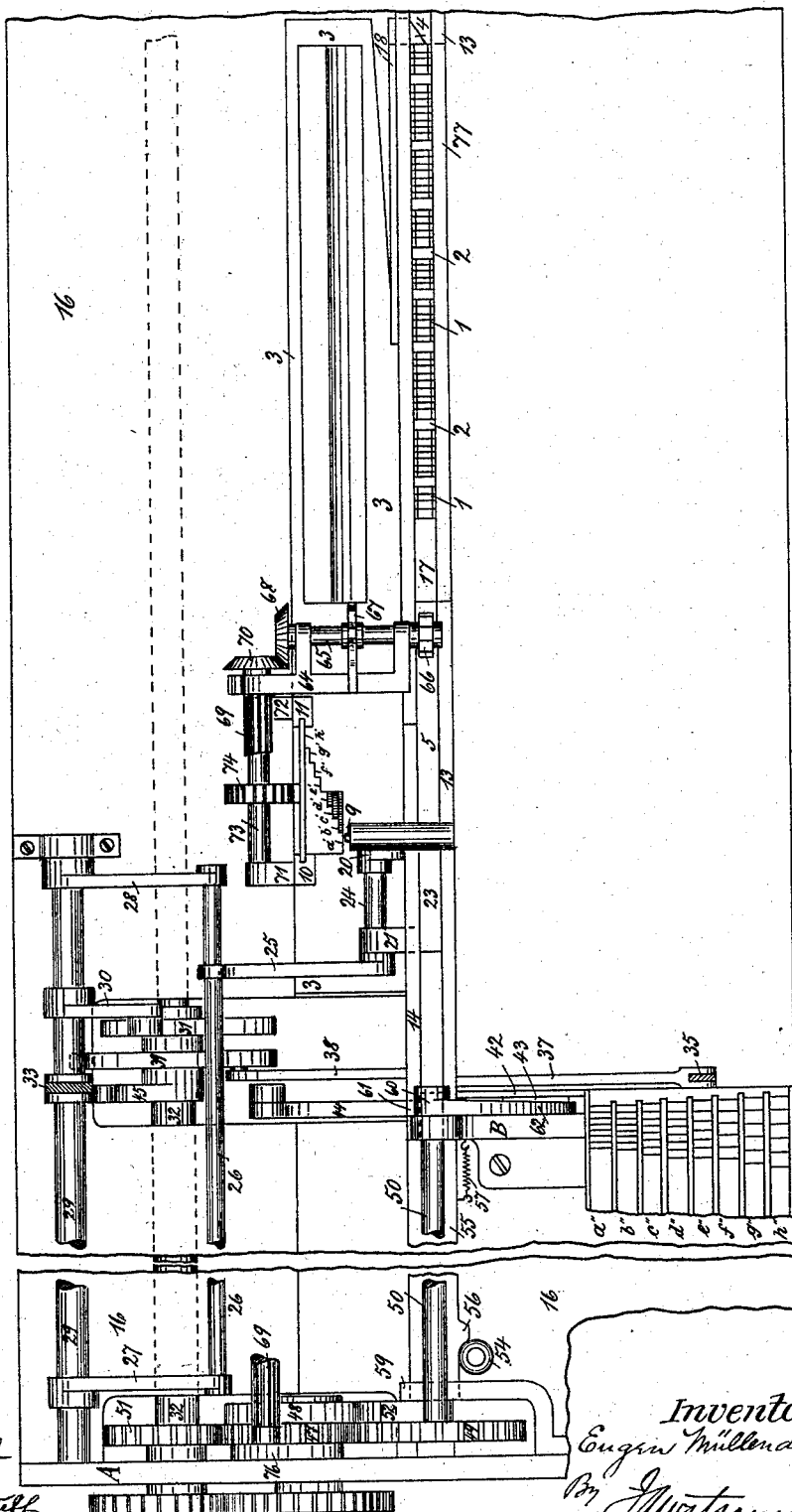

No. 705,693. Patented July 29, 1902.
E. MÜLLENDORFF.
MECHANISM FOR JUSTIFYING LINES COMPOSED OF TYPES OR MATRICES.
(Application filed Jan. 25, 1899.)
(No Model.) 6 Sheets—Sheet 1.
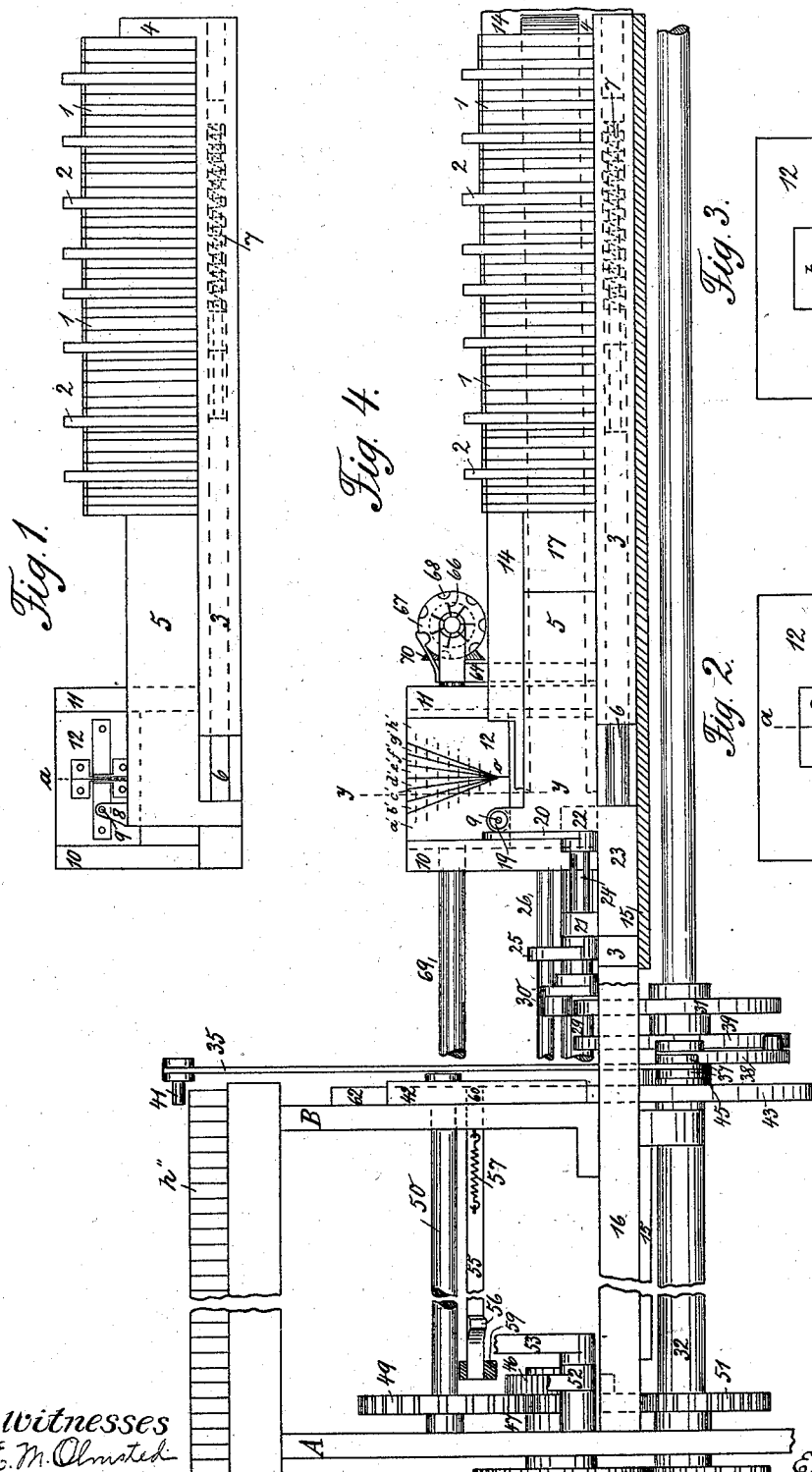
Witnesses
E. M. Olmsted
William E. Neff
Inventor
E. Müllendorff
by J. A. Watson Atty No. 705,693. Patented July 29, 1902.
E. MÜLLENDORFF.
MECHANISM FOR JUSTIFYING LINES COMPOSED OF TYPES OR MATRICES.
(Application filed Jan. 25, 1899.)
(No Model.) 6 Sheets—Sheet 2.

Witnesses
E. M. Olmsted
William E. Neff

Inventor
Eugen Müllendorff
By J. L. Watson atty

No. 705,693. Patented July 29, 1902.
E. MÜLLENDORFF.
MECHANISM FOR JUSTIFYING LINES COMPOSED OF TYPES OR MATRICES.
(Application filed Jan. 25, 1899.)
(No Model.) 6 Sheets—Sheet 3.

Witnesses
E. M. Olmsted
William E. Neff

Inventor
Eugen Müllendorff
By J. A. Watson
Attorney

No. 705,693. Patented July 29, 1902.
E. MÜLLENDORFF.
MECHANISM FOR JUSTIFYING LINES COMPOSED OF TYPES OR MATRICES.
(Application filed Jan. 25, 1899.)
(No Model.) 6 Sheets—Sheet 4.
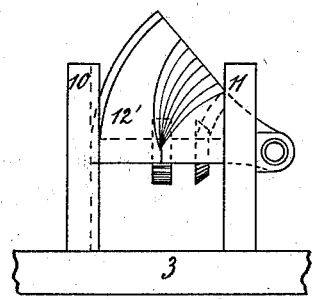
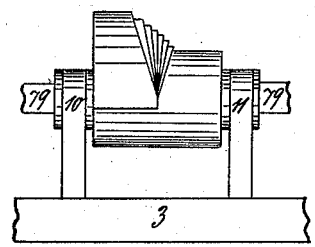
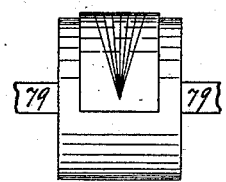
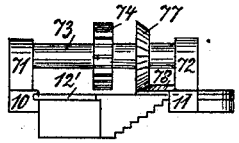
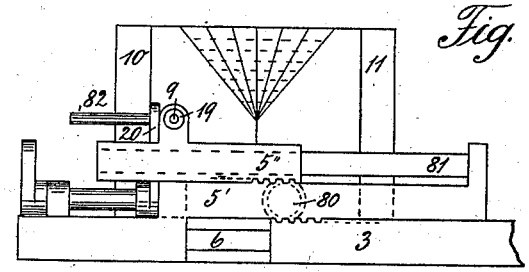
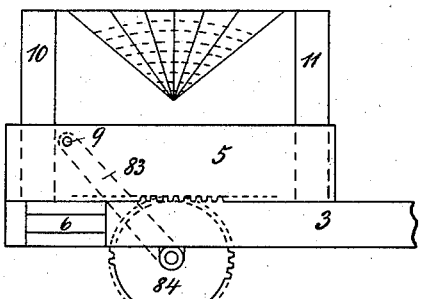
Witnesses
E. M. Olmsted
William E. Neff
Inventor
Eugen Müllendorff
By J. A. Watson,
Attorney.
THE NORRIS PETERS CO., PHOTO-LITHO., WASHINGTON, D. C.

No. 705,693. Patented July 29, 1902.
E. MÜLLENDORFF.
MECHANISM FOR JUSTIFYING LINES COMPOSED OF TYPES OR MATRICES.
(Application filed Jan. 25, 1899.)
(No Model.) 6 Sheets—Sheet 5.
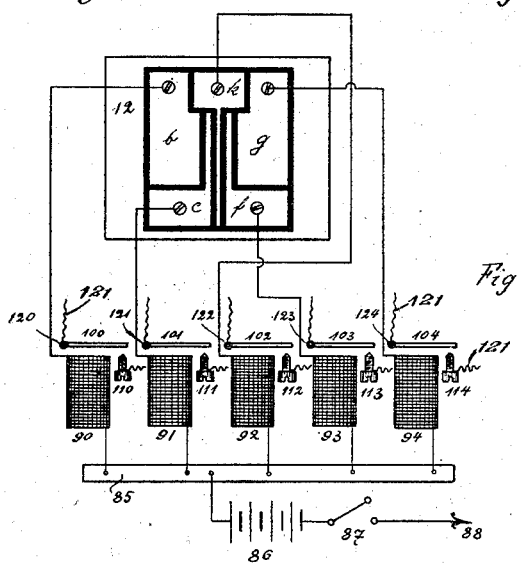
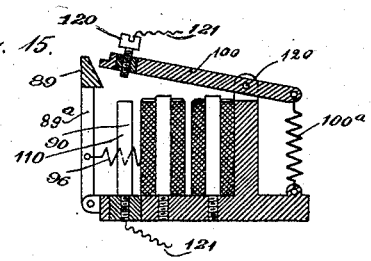
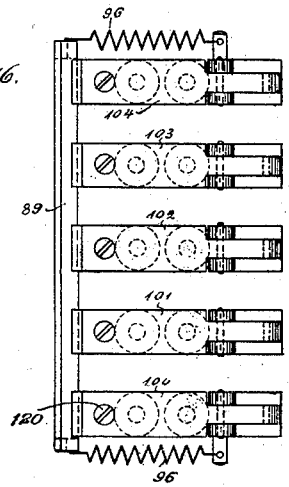
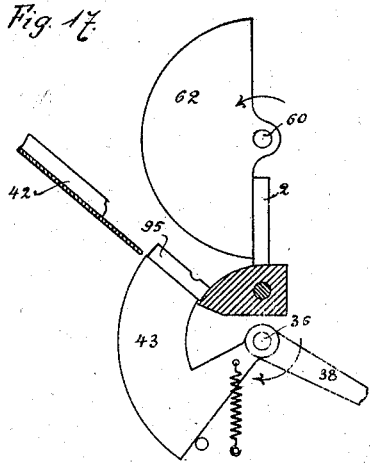
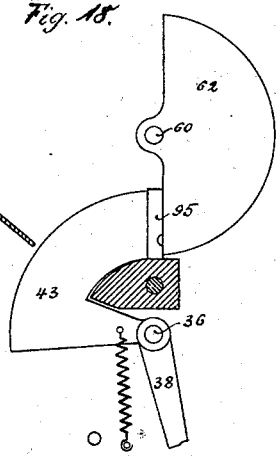
Witnesses.
A Mitchell
C W Clement
Inventor
E Mullendorff
By J H Watson
Attorney.

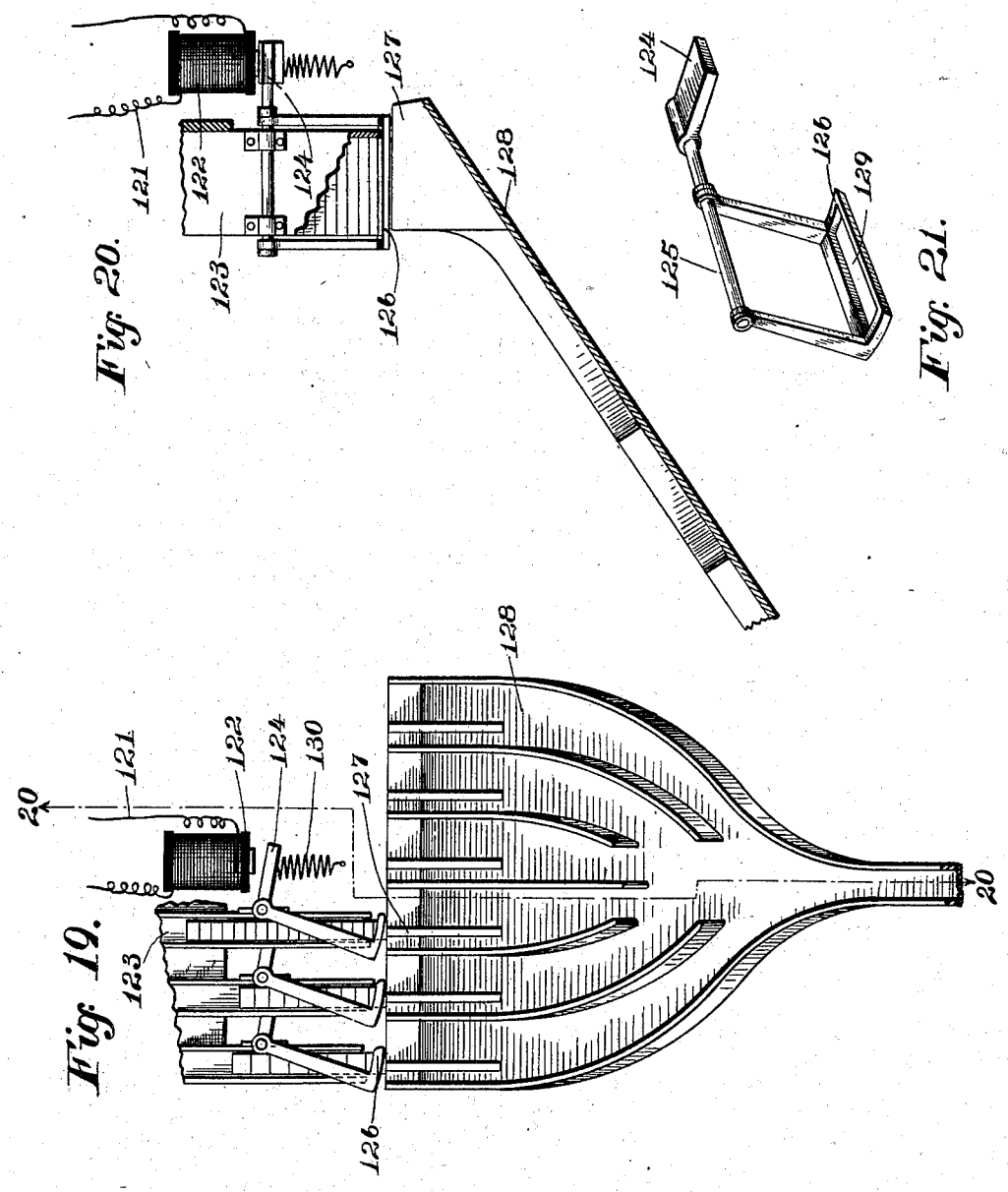

UNITED STATES PATENT OFFICE.

EUGEN MÜLLENDORFF, OF BERLIN, GERMANY.

MECHANISM FOR JUSTIFYING LINES COMPOSED OF TYPES OR MATRICES.

SPECIFICATION forming part of Letters Patent No. 705,693, dated July 29, 1902.

Application filed January 25, 1899. Serial No. 703,342. (No model.)

*To all whom it may concern:*

Be it known that I, EUGEN MÜLLENDORFF, a subject of the German Emperor, residing at Berlin, Germany, have invented new and useful Improvements in Mechanism for Justifying Lines Composed of Types or Matrices, of which the following is a specification.

My invention relates to that method of justifying in which a set of justifying-spaces of different sizes is held stored and the spaces required for each line are singly selected from that set and substituted for the provisional spaces contained in the line.

In the following specification I shall term the difference between the amount of matter in an unjustified line and the required length of line or column-measure the "variation" of the line. This variation may be a plus or a minus quantity, depending upon whether the line is too long or too short. The places between words in which justifying-spaces are to be inserted I shall term "intervals," and the pieces utilized to separate the words in the unjustified lines I shall term "separators." The number of intervals and separators in a line will be, of course, one less than the number of words. The final spaces which are used to separate the words in the justified lines will be termed "justifying-spaces," and the mechanism which removes the separators and inserts the justifying-spaces I will term the "spacing mechanism." The separators which I prefer to use are preferably equal in width to the most desirable width for the justified line, which may be termed the "normal" width.

The term "type" as used herein will be understood to include matrices, such as are used in linotyping, as well as ordinary printers' type.

Lines of type to be justified by the present invention may be assembled by any suitable composing mechanism, the lines being composed with separators between the words which differ in section from the type, so that the machine may distinguish between the type and separators and stop the line with the successive separators in register with the spacing mechanism. The unjustified line is measured between a fixed and a movable abutment, the position of the movable abutment indicating the variation of the line. A contact-point adjusted by the movable abutment is then brought into engagement with a contact-piece having a series of contact-surfaces which correspond in number to the number of sizes of justifying-spaces in the magazine. Some of these spaces are equal to the normal spaces or separators and others are larger and smaller. If the unjustified line is too long, the contact-pin selects a section of the spacing-piece corresponding to a justifying-space thinner than the normal. If the line is but slightly too long, the space next thinner than the normal will be selected, and if it is considerably too long a still thinner space will be selected. The relative positions of the contact-piece and the pin or coöperating element are made to select the justifying-space, and the spacing mechanism immediately ejects the separator and inserts the selected space in its place. The line is then moved until the second separator registers with the spacing mechanism, and simultaneously it is remeasured and the relative positions of the contact-piece and contact-pin readjusted. If the line should now be of the required length, a justifying-space equal to the separator would be selected. If too long, a thinner space will be selected, and if too short a thicker space. The selection of each justifying-space is entirely independent of the selection of the other spaces for a line. The justification of a line may be effected without reference to the number of intervals in it; but by taking into account the number of intervals the variation may be distributed more evenly throughout the line—that is, justifying-spaces more nearly uniform in thickness may be selected.

I have represented my invention in the accompanying drawings, of which—

Figure 6:
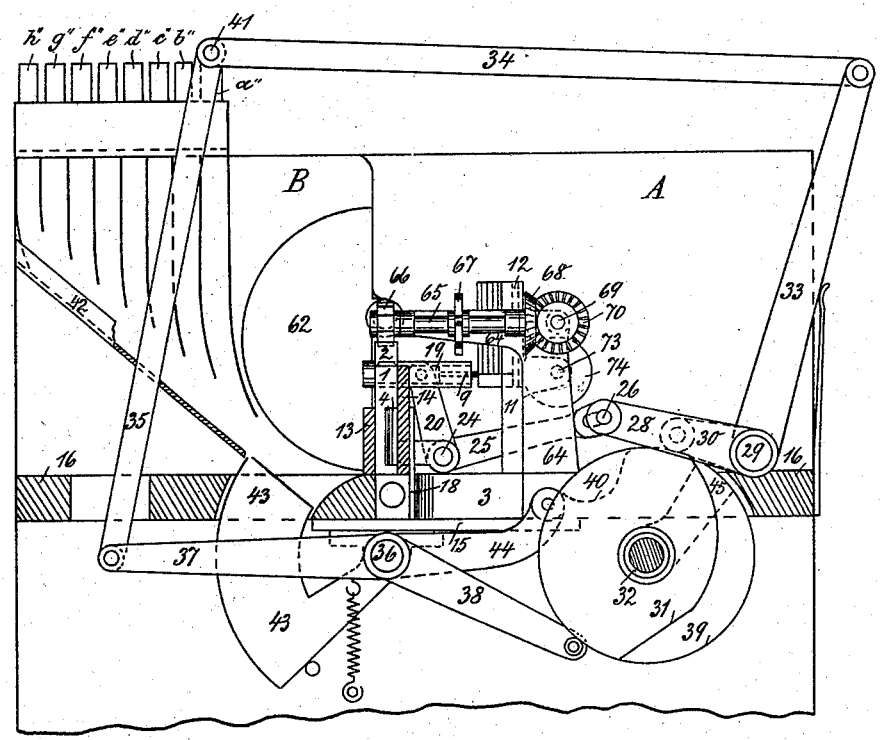
Figure 7:
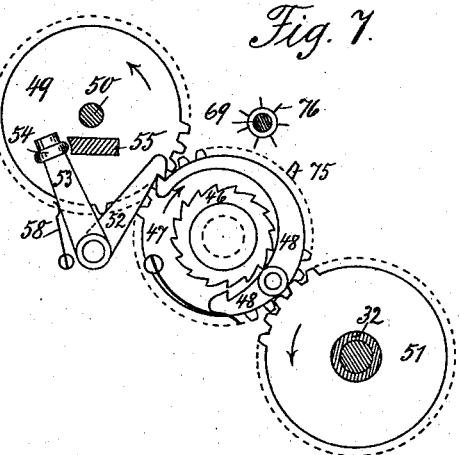

Figure 1 shows the simplest feature of my invention as concerning the selection of spaces, Figs. 2 and 3 being detached views, on an enlarged scale, of a part of Fig. 1. A complete apparatus according to my invention is represented in Figs. 4 to 6, inclusive, of which Fig. 4 is a front view, partially in section, the front wall of the type-containing channel being removed; Fig. 5, a top view, and Fig. 6 a side view, partially in section, looking from the right of Figs. 4 or 5. Fig. 7 is a view corresponding to Fig. 6 and showing the connection between the main driving mechanism and the parts actuated by the same. Figs. 8 to 13, inclusive, represent modifications of the space-selecting mechanism hereinafter fully described. Fig. 14 is a diagram illustrating electrical connections. Fig. 15 is a vertical section, and Fig. 16 a plan view, of the operating-magnets of said connections. Figs. 17 and 18 are sectional views illustrating the operation of the devices for inserting justifying-spaces in the line. Fig. 19 is a front view of a device for ejecting spaces from their magazine. Fig. 20 is a section on the line 20 of Fig. 19, and Fig. 21 is a detail of the space-ejector.

Referring first to Fig. 1, the line to be justified consists of types or matrices 1 and separators 2 and is contained in a carrier bearing the bottom plate 3 of the carrier and clamped between a right-hand abutment 4 thereof and a left-hand slide-piece 5, which is guided in plate 3 by means of a rod 6 and continuously actuated toward the right by means of a coiled spring 7. The line is laterally supported by two walls 13 14, Fig. 5, these walls being omitted in Fig. 1 and only wall 14 represented in Fig. 4. Slide-piece 5 is provided with a small plate 8 and a pin 9, laterally projecting from plate 8. Two uprights 10 11 are mounted on plate 3, carrying a plate 12. By these means pin 9 will occupy a determined relative position with respect to plate 12 in accordance with the length of the provisional line clamped between abutment 4 and slide-piece 5, this position being such that in case of the provisional line showing just the required normal length pin 9 will coincide with line $a$ $a$ of plate 12, (see Fig. 2,) but stand at the left of line $a$ $a$ or at the right thereof in case of the provisional line being too long or too short.

When selecting the spaces by electrical means, I make plate 12 of non-conducting material, and I provide it with contact-pieces $b$ $c$ $d$ $e$ $f$ $g$ of metal and of the shape represented in Fig. 2, these pieces being insulated against each other by thin layers of insulating material interposed between their adjacent edges. The said pieces are connected by wires to respective releasing mechanisms for the spaces—say piece $b$ with that for the thinnest kind $b''$ of spaces and piece $g$ with that for the thickest kind $g''$ of spaces, while the spaces $c''$ $d''$ $e''$ $f''$, corresponding to pieces $c$ $d$ $e$ $f$, only slightly differ in thickness from the uniform thickness of the separators. If, for instance, the latter be given a thickness of $n$ units, the justifying-spaces $d''$ $c''$ $e''$ $f''$ may be conveniently made of a thickness of $n-1$, $n-2$, $n+1$, $n+2$ units, respectively, and the small consecutive sections of pieces $c$ $d$ $e$ $f$ of an extent of one unit each, the said unit being supposed of a sufficiently small and practically insignificant size.

Pin 9 is held in contact with the pieces $b$ $c$ $d$ $e$ $f$ $g$ when traveling along the same. If, therefore, pin 9 is adjusted in accordance with the length of the provisional line, it will make contact with one of the pieces $b$ $c$ $d$ $e$ $f$ $g$ and the corresponding line-circuit will be closed to release the space required.

The operation is as follows: Suppose the provisional line being essentially too long and pin 9 therefore making contact with piece $b$, a justifying-space of the thinnest kind $b''$ will be released and inserted into the line, removing at the same time a separator-space, as will be hereinafter described. By this the line will be shortened and pin 9 shifted a corresponding distance toward the right; but as the pin still remains in contact with piece $b$ another space of kind $b''$ will be released, and so on, until finally pin 9 leaves piece $b$ and reaches piece $c$. This will occur if after the insertion of a sufficient number of spaces of the thinnest kind the excess of the line is between one and two units. A space of $n-2$ units would therefore now be released, and this space should bring the line to the exact length or at most render it one unit too short, pin 9 then passing on contact-piece $e$. If then the spacing of the line should be finished, the line would definitively show a remainder of one unit, but practically be justified. On the other hand, if there are still intervals in the line when pin 9 passes on contact-piece $e$ it will be obvious that from thence pin 9 should alternately pass from piece $e$ to $d$, and vice versa, releasing alternately spaces of the kinds $e''$ $d''$ and accordingly finishing the line with a slight excess or remainder of at most one unit.

A modified arrangement of contact-pieces is represented in Fig. 3, pieces $b$ and $g$ belonging again to the thinnest and thickest kinds of justifying-spaces, respectively, and the middle piece $k$ to justifying-spaces of the same thickness as the separators—say of $n$ units—while the spaces released by piece $c$ may be a thickness of $n-1$ units and those released by piece $f$ of $n+1$ units. The narrow sections of pieces $c$ and $f$ are given each an extent of one unit and preferably a slightly-larger extent to the middle narrow section of piece $k$. In this arrangement pin 9 once having reached contact-piece $k$ remains on that piece for the remainder of the justification of the line, as piece $k$ releases justifying-spaces of the same thickness as the separators—say of $n$ units—and the length of the line is not varied by the substitution of the latter by the former. The line will therefore likewise be finished with an excess or remainder of at most half a unit.

It is of no importance how many contact-pieces and how many kinds of spaces are disposed of nor what thickness the different kinds of thinnest and thickest spaces has been given. It is only needed that the middle sections, three or four, next to the line corresponding to the relative position of pin 9 when registering the normal length of line are made comparatively narrow and the corresponding spaces are so slightly stepped or different from the normal width and from each other that the variation, excess, or remainder of the line will practically be of an insignificant size. However, there will hereinafter be described means allowing of a larger extent to be given the sections of the middle contact-pieces and yet of slightly stepping the corresponding spaces.

The contact-face of pin 9 is preferably made as small as possible. However, it must be of a larger diameter than the extent of the separating-layer between the adjacent contact-piece sections in order to prevent this pin ever bearing exclusively against such an insulating-layer and being out of contact with any conducting-piece.

In Fig. 14 is illustrated a contact-plate similar to that shown in Fig. 3 and the inserting electrical connections therefor.

Referring to Figs. 14, 15, and 16, 90 to 94, inclusive, indicate electromagnets, each having one of its terminals connected to a common conductor-bar 85 and its other terminal to one of the sections of the contact-plate. Below the bar is illustrated a battery 86, a line-wire 88, and a switch 87. The line 88, it will be understood, connects to the contact-pin 9. Above the magnets are illustrated their armatures 100 to 104. In Figs. 15 and 16 is illustrated a locking-bar 89, carried on pivoted arms 89$^a$. Springs 100$^a$ normally hold the armatures away from the magnets. When a magnet is energized, its armature is drawn down and interlocked with the bar 89, the latter being operated in one direction by the armatures and in the other direction by springs 96. When a second magnet is energized, its armature throws back the locking-bar 89 and releases the previously-depressed armature. In this way but one armature can be depressed at a time. The movement of the armatures 100 to 104 may be used to effect the discharge of the corresponding spaces from the magazines, the armatures being connected to space-pushers in any well-known manner. If more power be needed for discharging the spaces, the electromagnet devices may be used simply to close circuits having stronger currents. This arrangement is illustrated in the drawings, in which there is a contact-piece 110 adjacent to each magnet and a coöperating contact 120 upon each armature. When an armature is drawn down, these contacts close a circuit 121, which may be utilized in any desired manner to control the mechanism for discharging and inserting the spaces.

Referring to Figs. 19, 20, and 21, 122 indicates a magnet in the circuit 121, adapted to eject spaces from one of the channels 123 of the space-magazine. As shown, the armature 124 is fast on a rock-shaft 125, which carries the ejector 126. The spaces rest on ledges 127 on the apron 128. When the ejector is in its normal position, the space resting directly on the ledge stands within an opening 129 in the ejector. When the magnet is energized, the ejector moves the space off the ledge and drops it on the apron, the succeeding space resting on the ejector until the latter resumes its normal position in response to the pull of the spring 130. The specific devices illustrated in Figs. 19, 20, and 21 are not of my invention.

If instead of electrically selecting the spaces it should be preferable to use mechanical means, the contact-pieces $b\ c\ d\ e\ f\ g$ are to be replaced by blocks differently projecting from plate 12, as now will be described with reference to Figs. 4 to 7, inclusive, showing a complete and mechanically-actuated apparatus according to my invention.

The line 1 2 is supported, as heretofore described, by a carrier 3 4 5, movable between walls 13 14 and guided by the bottom plate 3 in a slot of frame-plate 16 and on a supporting-plate 15. Slide-piece 5, guided by rod 6 and actuated by spring 7, bears against an intermediate piece 17, thus indirectly clamping the line from the left. There are provided intermediate pieces 17 of different lengths for the different lengths of lines in order to always keep pin 9 in the reach of plate 12 and to make it coincide with line $a\ a$ on plate 12 whenever a line (of any length) is brought to the normal size. The abutment 4 for the right-hand end of the line consists in the present instance of a catch projecting from a spring 18, which is secured to plate 3 and enters the path of the line through a lateral slot of channel-wall 14. The catch allows of the line being delivered to the carrier and then catches the line from the right, thus forming the fixed right-hand abutment for the same.

In case of justifying the line independently of the number of its intervals, plate 12 is constructed as described with reference to Figs. 2 and 3, with the only modification, already referred to, that the contact-pieces $b\ c\ d\ e\ f\ g$ are replaced by blocks differently projecting from plate 12, so as to form steps gradually descending from the left toward the right; but if reference is had to the number of intervals contained in the line, as supposed in Figs. 4 to 6, plate 12 is to be arranged vertically movable on the uprights 10 11 and the stepped blocks $b'\ c'\ d'\ e'\ f'\ g'$ converging toward a common center, as represented, Figs. 4 and 5. An uppermost step $a'$ is provided adjacent to step $b'$ and a lowermost one, $h'$, adjacent to step $g'$ and formed by the level of plate 12.

The spaces are stored in channels $a''\ b''\ c''\ d''\ e''\ f''\ g''\ h''$, beginning with the thinnest ones and successively stepped to end with the thickest ones at $h''$, thus corresponding in this succession to the steps $a'$ to $h'$.

Pin 9 is secured to a plug 19, the latter being guided in a projection of slide-piece 5 and engaging by a pin with a slotted lever 20 on a spindle 24, which is journaled in supports 21 22 of an extension 23 of slide-piece 5.

A lever 25 on spindle 24 embraces with its forked end a rod 26, supported by arms 27 28 of a rock-shaft 29, and on the latter is mounted a spring-actuated lever 30 to bear with a roller against a cam-disk 31, which is provided on an intermittingly-revolving shaft 32.

Rock-shaft 29 carries a lever 33, pivoted to a rod 34, and the latter is loosely connected by a rod 35 to a two-armed spring-actuated lever 37 38, pivoting on a stud 36 and bearing with its roller-arm 38 against a disk 39, which is mounted on shaft 32 and provided with a recess 40.

The operation of the parts described is as follows: Pin 9 having been adjusted with respect to plate 12 in accordance with the length of the line, shaft 32 is released, as will be hereinafter described, to perform one revolution, and by passing of the depressed cam portion of disk 31 underneath lever 30 pin 9 is forwarded toward plate 12 until it reaches the opposite step-piece and is stopped thereby. Lever 33 and rod 34 performing a corresponding stroke, a pin 41, Fig. 4, laterally projecting from rod 34, is brought opposite to the foremost space of the channel which contains the spaces corresponding to the step reached by pin 9, and as then during the continued revolution of shaft 32 recess 40 of disk 39 passes roll on lever 38 rod 35 swings downward, withdrawing the space from its channel by pin 41. The released space then drops by gravity and reaches the inclined guide-channel 42, on which it descends to reach the swinging pusher 43, pivoted on stud 36 and controlled by a cam-lever 45 on shaft 32, cooperating with the lever-arm 44 of the pusher. The parts are disposed in such manner that as soon as the space reaches the pusher the latter is caused to rise, taking along with it the space and inserting it into the line, as as will be hereinafter fully described. Shaft 32 is actuated as follows: A ratchet-wheel 46 is fixed to a stub-shaft 102, journaled in a frame-plate A, Figs. 4, 5, 7, and a toothed wheel 47, movably mounted on the stub-shaft-supporting box, carrying a pawl 48 to engage with the ratchet-wheel, wheel 47 engaging with a toothed wheel 49, mounted on a shaft 50, and on the other hand with a toothed wheel 51, mounted on hollow shaft 32, through which passes the drive-shaft 103. The stub-shaft is continuously driven from shaft 103 by means of connecting-gears 104 105. Pawl 48 is held out of engagement with ratchet-wheel 46 by means of a catch-lever 52 and a lever 53, firmly connected to lever 52 and bearing with a roller 54 against the edge of a longitudinally-movable bar 55, a spring 58 securing this position. By shifting bar 55 toward the left of Fig. 5 a tooth 56 of the rail passes underneath roller 54 and throws lever 52 out of engagement with pawl 48, which then engages with ratchet-wheel 46, taking along with it wheel 47 and in consequence thereof wheels 49 51 and shaft 32. Bar 55 is then shifted back toward the right by a spring 57, Fig. 4, and lever 53, thereby released from tooth 56, is restored by spring 58 to its normal position, Fig. 7, so as to likewise restore lever 52 to its normal position for catching again pawl 48 after one revolution of shaft 32. Bar 55 is guided in a bracket 59 and in the frame-plate B and is intermittingly shifted toward the left by a step-by-step movement of the line-carrier. The latter may be continuously actuated toward the left by a weight 100 and cord 101, Fig. 1, or slightly coupled by friction to a continuously-running belt and is released to follow this tendency after having been charged with a line, and as the separators project from the line into the level of bar 55 the carrier will be taken along until the foremost separator reaches the right-hand end 60 of bar 55, thus shifting the same toward the left and releasing pawl 48 from catch-lever 52, as heretofore described, while the line-carrier is at the same time stopped, the foremost space then being opposite to a slot 61, provided in channel-wall 14. As now shaft 32 performs its revolution and a justifying-space has been released and reached pusher 43, as heretofore described, a semicircular disk 62, which is mounted on shaft 50 and swings in line with slot 61, will be caused to pass through the line, taking along with it by its lowermost advancing edge the separator in front thereof, as illustrated in Fig. 17, and spacing the line for the insertion of the justifying-space. Disk 62 is slightly wedge-shaped, its advancing lowermost edge being of the same thickness (or near so) as the separators and its uppermost edge equalizing or slightly surpassing the thickness of the thickest justifying-space. By these means the space formed by passing through the line of disk 62 will be successively enlarged to allow of entering of the thickest space. In the meantime pusher 43 has been raised by cam-lever 45 following the justifying-space disk 62 and inserting the same into the space formed by disk 62, yet before the latter leaves the line, as illustrated in Fig. 18. Disk 62 then completes its revolution, and pusher 43 is restored to its normal position by gravity or by a spring. In the meantime cam-disk 31 has raised again lever 30, so as to return pins 9 and 41 to their normal positions by means of parts 26 25 24 20 and parts 33 34 35 37 38, respectively. Slide-piece 5, with pin 9, has therefore been adjusted again with respect to plate 12 in accordance with the variation of length of line undergone by the insertion of the justifying-space, while the line carried is advanced a further step until the next following space strikes again bar 55, which in the meantime assumed its right-hand normal position, and so on until all separators have been replaced by justifying-spaces and the line has been justified. The separators when removed from the line drop through an opening of plate 3 and are assembled in a box placed beneath the said slot. During the step-by-step movement of the line-carrier the forked end of lever 25 slides on rod 26, thus the releasing of a justifying-space being uniformly performed in whatever position of the carrier.

If in justifying a line reference is had to the number of its intervals, a more uniform spacing will be obtained, and in measure as that number is larger the uniform justifying-spaces throughout the line will differ less from the separators or normal spaces. To this fact corresponds the triangular shape of steps $b'g'$ on plate 12, (represented in Fig. 4,) supposing this plate being shifted in accordance with the number of intervals of each line to be justified—that is to say, in such manner that of the eight dotted lines crossing the steps the lowermost is brought opposite to pin 9 in case of a line containing but one interval and accordingly each next following up to the uppermost in case of a line containing two, three, four, five, six, seven, or eight intervals, respectively. It will be obvious that one and the same difference of length of a line which in a line with, say, eight intervals can be made by justifying-spaces but slightly differing from the separators cannot be made up by the same spaces in a line with, say, three intervals, but only by spaces differing more essentially from the separators. To this fact corresponds the triangular shape of steps represented in Fig. 4, as will be noted by the dotted line $y\ y$, corresponding to a certain excess of line and successively passing from above to below through steps of increasing deviation. A theoretical inquiry results in giving the steps the represented triangular shape, with a common center at $o$.

The vertical adjustment of plate 12 in accordance with the number of intervals of each line may be performed in any convenient manner. Supposing the justifying apparatus being connected to a setting-machine, a ratchet mechanism may be operated by each stroke of the space-key; but I prefer to adjust plate 12 independently thereof, as follows: A support 64 is connected to frame-plate 10, carrying a shaft 65, on which are mounted a star-wheel 66, a notched disk 67, and a beveled wheel 68, the latter engaging with a beveled wheel 70 on a pinion-shaft 69, extending throughout the apparatus and journaled at one end in support 64 and in the frame-plate A at the other end. A shaft 73 is journaled in projections 71 72 of the uprights 10 11 and a toothed wheel 74 mounted on shaft 73, engaging with a rack on the rear side of plate 12 and with pinion-shaft 69, the latter thus being in continuous engagement with wheel 74 in whatever position of the line-carrier.

In the normal position of parts represented, Fig. 4, the center of convergency $o$ is on a level with pin 9. If now the line-carrier is moved toward the left, the projecting ends of separators 2 pass underneath star-wheel 66, which thus will be accordingly turned around so as to shift plate 12 and bring the dotted line corresponding to the number of intervals to a level with pin 9. The latter therefore selects the first and most convenient space for justifying the line in question. During the insertion of this space, as described, wheel 47 performs one revolution, and as wheel 47 is provided with a tooth 75, Fig. 7, and pinion-shaft 69 with a star-wheel 76 in line with tooth 75 to engage with the latter, shaft 69 will accordingly be rotated backward and plate 12 again raised the distance of two consecutive level lines, thus the changed position of plate 12 corresponding to the changed condition of the line—*i. e.*, to a new line containing one interval less and showing another difference to be made up in accordance with the gist of my invention. The said operation is repeated until after the insertion of the last justifying-space. The center of convergency $o$ will be restored in level with pin 9, plate 12 thus being moved to position to be adjusted by passing of the next line underneath star-wheel 66.

Notched disk 67 serves the purpose of controlling the step-by-step shifting movement of the parts by a spring-pawl $67^a$, Fig. 4, engaging with the notches of disk 67 and preventing overswinging.

The line having been justified, the line-carrier is to be shifted again toward the right into its normal position. This may be done by hand or automatically by any convenient means; but this being no part of my invention it is not deemed necessary to show such means. The line is then removed from the line-carrier into a galley and a fresh line delivered to the carrier.

For easily removing the justified line a portion 77, Fig. 5, of wall 13 is preferably made removable.

In Figs. 8 to 13 I have represented modifications of the space-selecting means. In Fig. 8, front view, and Fig. 9, corresponding top view, plate 12' is pivotally arranged and guided in uprights 10 11 by a groove and a slot. Wheel 74 in this modification only engages with pinion-shaft 69, the swinging movement of plate 12' being effected by a beveled wheel 77 engaging with a beveled segment 78, provided to the plate. The stepped portions of the selecting-block are of curved triangular shape in accordance with its swinging movement. If using electrically-actuating means, plate 12' is simply provided with contact-pieces, as heretofore described, of the same shape as appearing from Fig. 8. In Figs. 10, 11 the selecting-block or contact-pieces are provided on cylinders. In this modification shaft 73 and wheel 74 can be dispensed with and pinion-shaft 69 replaced by a square shaft $69^a$, placed at the height of shaft 73 and allowing only of a shifting movement of the cylinders with respect to the shaft. In Figs. 12, 13 I have represented modifications in which, as above mentioned, the single contact-pieces or selecting steps are enlarged, the stroke of pin 9 being likewise enlarged above that of the clamping slide-piece. In Fig. 12 slide-piece 5' carries a pinion 80, engaging with teeth of plate 3, and another slide-piece 5'' is guided on a bar 81 of piece 5' and provided with the contact-pin 9, engaging at the same time with pinion 80. By these means, as well known, slide 5'' performs the double of the stroke of slide 5'. In this modification the pin 82 of stud 19, which engages with lever 20, must be given a sufficient length, the parts 5' 5'' performing a relative shifting movement. In Fig. 13 pin 9 is carried by a lever-arm 83, mounted on the axis of a toothed wheel 84, which latter engages with teeth provided in the lower edge of slide-piece 5. Thus the radius of pin 9 being enlarged above that of wheel 84, the pin will perform a larger stroke than slide-piece 5.

The advantage of enlarging the contact-pieces or selecting steps by the means shown in Figs. 12, 13 is of most importance in proximity of the center of convergency o.

What I claim as my invention, and desire to secure by Letters Patent, is—

1. A type-justifying mechanism comprising, in combination, means operating to measure a line of type independently for each justifying-space to be selected, a contact-piece having space-value-determining surfaces, and an element coöperating with said contact-piece, the relative positions of said element and contact-piece being separately determined by each measurement of the line.

2. A justifying mechanism comprising, in combination, spacing mechanism for inserting justifying-spaces in a line, a movable line-holder adapted to carry a line of type to the spacing mechanism, and space-value-determining devices movable with the line under justification, and comprising a contact-piece having space-value-determining elements and a part coöperating with said contact-piece.

3. A justifying mechanism comprising, in combination, spacing mechanism for inserting justifying-spaces in a line, a movable line-holder adapted to carry a line of type to the spacing mechanism, and space-value-determining devices movable with the line under justification, and comprising line-measuring devices having two relatively movable parts engaging the ends of the line.

4. A justifying mechanism comprising, in combination, spacing mechanism for inserting justifying-spaces in a line in lieu of temporary spaces, means for moving a line of type intermittently relatively to said spacing mechanism, measuring devices including two relatively movable parts engaging the ends of the line for measuring the line prior to the insertion of each space, and means controlled by said measurement for selecting the proper justifying-space to be inserted after each measurement.

5. A justifying mechanism comprising, in combination, spacing mechanism for inserting justifying-spaces in a line in lieu of separators, means for moving a line of type and separators past said spacing mechanism, means for intercepting the movement of the line each time a separator reaches the spacing mechanism, means independent of the separators for measuring the line before each separator is removed, and space-value-determining devices controlled by the successive measurements thereof, said devices in turn controlling the selection of the justifying-spaces to be inserted in lieu of the separators.

6. A justifying mechanism comprising, in combination, means for moving a line of type and separators to a spacing mechanism, means for stopping the line as each separator reaches the spacing mechanism, means independent of the separators for measuring the line as many times as there are separators therein, and space-value-determining devices controlled by said measurements, each measurement controlling the selection of a suitable justifying-space to be inserted in lieu of one of the separators.

7. A justifying mechanism comprising, in combination, means for ejecting separators from a line and inserting justifying-spaces, means for moving the line to said spacing mechanism, and space-value-determining elements movable with the line, said elements consisting of a measuring device, a contact-piece having space-value-determining surfaces, and a part adapted to coöperate with one or other of said surfaces as may be determined by the measurement of a line.

8. A justifying mechanism comprising, in combination, a movable type-line holder, space-value-determining elements having a relative movement depending upon the measurement of a line of type under justification and a bodily movement with the line-holder, said elements consisting of a contact-piece having space-value-determining surfaces, and a pin movable into contact with one or other of said surfaces, depending upon the measurement of the line.

9. A justifying mechanism comprising, in combination, a contact-piece having a series of angular space-determining surfaces, a contact-point movable to register with any one of said surfaces, and means for controlling the relative adjustment of said contact-piece and pin by the length of the line under justification.

10. A justifying mechanism comprising, in combination, a contact-piece having a series of space-value-determining devices, said devices being triangular in outline and converging to a common center, means for adjusting said contact-piece according to the number of separators in a line to be justified, a contact-point coöperating with said contact-piece, and means for adjusting said contact-point relatively to the contact-piece in accordance with the measurement of a line.

11. A justifying mechanism comprising, in combination, a contact-piece having a series of stepped space-value-determining surfaces, a contact-point movable to engage one or other of said surfaces, means for adjusting the point relatively to the contact-piece in accordance with the measurement of a line, and means for selecting justifying-spaces controlled in accordance with the amount of movement required to bring said point into contact with the opposing step of the contact-piece.

12. A justifying mechanism comprising, in combination, a contact-piece having a series of space-value-determining surfaces, means for moving a line of type and projecting separators, means operated by the projecting separators for adjusting the contact-piece in accordance with the number thereof, a contact-point coöperating with the contact-piece, and means for adjusting the contact-point in accordance with the measurement of the line, said contact piece and point operating to determine the values of justifying-spaces for the line.

13. A justifying mechanism comprising, in combination, a contact-piece having a series of angular stepped surfaces radiating from a common center, and means for adjusting said contact-piece in accordance with the number of separators in a line to be justified.

14. A justifying mechanism comprising, in combination, a contact-piece having a series of space-value-determining surfaces, a contact-point coöperating with said surfaces, means for moving a line of type and separators to a spacing mechanism, means for moving said contact-piece and contact-point with the line, means for counting the separators as the line is moved to the spacing mechanism, means for adjusting the contact-piece in accordance with the number of word-spaces, and means for adjusting the contact-point by the measurement of the line, and for readjusting said point by a remeasurement of the line after each separator is substituted by a justifying-space.

15. A justifying mechanism comprising, in combination, a contact-piece having a series of space-value-determining surfaces, a contact-point coöperating with said surfaces, means for measuring a line of type to be justified, and means for moving said contact-point relatively to the contact-piece a multiple of the movement of the measuring device.

16. In a justifying mechanism, means for spacing a line of type composed with separators, comprising a wedge-shaped piece movable through the line and adapted to remove the separator and open the line, and a pusher arranged to insert a justifying-space in the opening in combination with mechanism constructed to predetermine the space-values of justifying-spaces and deliver such spaces to the pusher.

17. In a justifying mechanism, means for spacing a line of type composed with separators, comprising a wedge-shaped piece movable through the line and adapted to remove a separator and open the line, and an independently-movable pusher arranged to insert a justifying-space in the opening so created in the line.

18. In a justifying mechanism, means for spacing a line of type composed with separators comprising a wedge-shaped piece, means for moving the same through a line with the thin edge foremost whereby the separator is removed and the line opened to receive a justifying-space, and a pusher arranged to move a justifying-space into the opening, said pusher being timed to enter the justifying-space in the line before the wedge-piece leaves the same in combination with mechanism constructed to predetermine the space-values of justifying-spaces and deliver such spaces to the pusher.

19. In a mechanism for justifying lines of type composed with separators, a wedge-piece movable through the line to remove a separator, said piece being arranged to always enter the line at one side and leave it at the other, and means for pushing a justifying-space into the line in the rear of the wedge-piece.

20. In a mechanism for justifying lines of type composed with separators, a segmental wedge-piece mounted on an intermittently-rotating shaft, said wedge-piece being adapted to remove separators and open the line to receive justifying-spaces and an independently-movable pusher arranged to insert justifying-spaces in the openings so created.

21. In mechanism for justifying lines of type composed with separators, in combination, a rotating segmental wedge-piece adapted to remove separators, and a rocking pusher adapted to thrust justifying-spaces into the line in the rear of the wedge-piece.

22. A justifying mechanism comprising, in combination, a series of channels for justifying-spaces, a space-ejecting element, two links connected to and supporting said element, a cam and connections for moving one of said links to bring said ejecting element into register with the proper space-channel, and a second cam and connections for moving the other link to cause said element to eject a selected space.

23. A justifying mechanism comprising, in combination, a series of channels for justifying-spaces, a space-ejecting element, two links connected to and supporting said element, a cam and connections for moving one of said links to bring said ejecting element into register with the proper space-channel, a second cam and connections for moving the other link to cause said element to eject a selected space, a common shaft upon which said cams are mounted, and means for rotating said shaft intermittently.

24. A justifying mechanism comprising, in combination, a series of channels for justifying-spaces, a space-ejecting element, a space-pusher to which the ejected spaces are delivered, a wedge-piece adapted to move through the line to open the same, means for feeding the line intermittently to the spacing mechanism, space-value-determining means movable with the line, and a sliding connection between said space-value-determining means and said spacing means whereby the latter may be operated by the former at any position of the line under justification.

25. A justifying mechanism comprising, in combination, a series of channels for justifying-spaces, a space-ejecting device including a rock-shaft and a bail rigidly carried by said rock-shaft, means for feeding a line of type and separators intermittently, means movable with the line of type and adapted to determine the values of justifying-spaces required for the line, and a sliding connection between said space-determining means and said rock-shaft bail whereby the space-ejector may be adjusted at any position of the moving line.

26. In a justifying apparatus, the combination of a line-carrier provided with a fixed abutment for one end of the line and with a movable abutment to bear against the other end of the line, a pin connected with one of the abutments, a contact-piece connected with the other abutment to coöperate with the said pin and provided with sections corresponding each to a certain value of justifying-spaces, means for releasing the spaces, and means for controlling the releasing of the spaces by the coöperation of the said pin and contact-piece.

27. In a justifying apparatus, the combination of a line-carrier provided with a fixed abutment for one end of the line and with a movable abutment to bear against the other end of the line, a pin connected with one of the abutments, a contact-piece connected with the other abutment to coöperate with the said pin and provided with triangle-shaped sections converging toward a common center and corresponding each to a certain value of spaces, means for adjusting the pin and contact-piece to each other in accordance with the number of intervals contained in the line, means for successively readjusting the pin and contact-piece in conformity with the insertion of the spaces, means for releasing the spaces and means for controlling the releasing of the spaces by the coöperation of the said pin and contact-piece.

28. In a justifying apparatus, the combination of a movable line-carrier, a guideway for the traveling line-carrier provided with opposite openings for removing separators from and inserting justifying-spaces into the line respectively, a rotary wedge-shaped ejector to remove the separators and at the same time enlarge the opening of the line to the extent of the thickest justifying-space, a reciprocating pusher to insert the justifying-spaces, and means for successively stopping the line-carrier with the separators in line with the said openings and at the same time releasing the ejector and the pusher to perform one revolution and reciprocation respectively.

29. In a justifying apparatus, the combination of a line-carrier provided with a fixed abutment for one end of the line and with a movable abutment to bear against the other end of the line, a pin connected with one of the abutments, a contact-piece connected with the other abutment to coöperate with the said pin and provided with sections corresponding each to a certain value of justifying-space, a cam-shaft, a lever-and-rod system controlled by the cams of the cam-shaft and connected with the said pin, a pusher for ejecting justifying-spaces connected to the said lever-and-rod system, and means for temporarily releasing the cam-shaft to perform one revolution.

30. In a mechanism for justifying a line of type composed with separators having parallel sides, devices operating to measure the length of the line as many times as there are separators in the line, in combination with means, controlled by said devices in accordance with the respective measurements, for determining the respective spaces for justifying the line.

31. In a mechanism for justifying a line of type composed with separators, devices operating to measure the length of the line as many times as there are separators in the line, said devices comprising relatively movable parts engaging the ends of the line, in combination with means controlled by said devices, in accordance with the respective measurements, for selecting the respective spaces for justifying the line.

32. In a mechanism for justifying a line of type composed with separators, devices operating to measure the line as many times as there are separators in it, means for counting the separators, and means controlled by the successive measurements and by the number of separators for selecting the respective spaces for justifying the line.

33. In a mechanism for justifying a line of type composed with separators, devices operating to measure the line as many times as there are separators in it, means for counting the separators, means controlled by the successive measurements and by the number of separators for selecting the respective spaces for justifying the line, and means for replacing the separators with the selected justifying-spaces.

In witness whereof I have hereunto set my hand in presence of two witnesses.

EUGEN MÜLLENDORFF.

Witnesses:
HENRY HASPER,
ERWIN L. GOLDSCHMIDT.